US009170297B2

(12) United States Patent
Pugliesi-Conti (10) Patent No.: US 9,170,297 B2
(45) Date of Patent: Oct. 27, 2015

(54) SECURE LOW PIN COUNT SCAN (71) Applicant: NXP B.V., Eindhoven (NL)

(72) Inventor: Paul-Henri Pugliesi-Conti, Hermanville sur Mer (FR)

(73) Assignee: NXP B.V., Eindhoven (NL)

( * ) Notice: Subject to any disclaimer, the term of this patent is extended or adjusted under 35 U.S.C. 154(b) by 125 days.

(21) Appl. No.: 13/715,854

(22) Filed: Dec. 14, 2012

(65) Prior Publication Data

US 2013/0166977 A1 Jun. 27, 2013

(30) Foreign Application Priority Data

Dec. 22, 2011 (EP) .................................... 11290601

(51) Int. Cl.
| | |
|---|---|
| G01R 31/3177 | (2006.01) |
| G01R 31/3185 | (2006.01) |
| G06K 19/073 | (2006.01) |
| H04L 9/00 | (2006.01) |
| G01R 31/40 | (2014.01) |

(52) U.S. Cl.
CPC .... *G01R 31/3177* (2013.01); *G01R 31/318547* (2013.01); *G01R 31/318588* (2013.01); *G06K 19/07363* (2013.01); *H04L 9/002* (2013.01); *H04L 2209/16* (2013.01)

(58) Field of Classification Search
CPC .............. G01R 31/318536; G01R 31/318555; G01R 31/318547; G01R 31/318552; G01R 31/31701; G01R 31/3177; G01R 31/318588; G06F 11/27; G11C 29/56; G06K 19/07363; H04L 9/002; H04L 2209/16
See application file for complete search history.

(56) References Cited

U.S. PATENT DOCUMENTS

| | | | |
|---|---|---|---|
| 6,321,354 | B1 | 11/2001 | Prunier |
| 7,681,097 | B2 * | 3/2010 | Park ............................... 714/732 |
| 2003/0093730 | A1 * | 5/2003 | Halder et al. .................. 714/724 |
| 2004/0222305 | A1 | 11/2004 | Leaming |
| 2005/0240850 | A1 * | 10/2005 | Ohwada et al. ................ 714/738 |
| 2007/0143653 | A1 * | 6/2007 | Doorenbos et al. ........... 714/726 |
| 2007/0234157 | A1 * | 10/2007 | Rajski et al. ................... 714/728 |
| 2007/0288821 | A1 * | 12/2007 | Matsuo et al. ................. 714/728 |
| 2008/0201592 | A1 * | 8/2008 | Lawrence et al. .............. 713/323 |
| 2009/0132879 | A1 * | 5/2009 | Gangappa ...................... 714/729 |
| 2010/0253381 | A1 * | 10/2010 | Hapke et al. ................... 324/765 |

OTHER PUBLICATIONS

Yiunn, D. B. Y. et al. "Scalable Test Pattern Generation (STPG)", IEEE Symposium on Industrial Electronics and Applications, pp. 433-435 (2010).

Dhingra, S. "Comparison of LFSR and CA for BIST", Dept. of Electrical and Computer Engineering, Auburn University, 6 pgs, retrieved from the internet at: w.eng.auburn.edu/~agrawvd/COURSE/.../Dhingra_LFSR.pdf (2005).

(Continued)

*Primary Examiner* — April Y Blair
*Assistant Examiner* — Dipakkumar Gandhi (57) ABSTRACT

A contactless smartcard type integrated circuit needing only two pins for performing a standard ATPG test is disclosed. A scan test may be performed using one pin for the clock and the other pin for the input and input of the scan test data. Additionally, security is enhanced by using an embedded signature generator to avoid observation of the data shifted out.

12 Claims, 5 Drawing Sheets

(56) References Cited

OTHER PUBLICATIONS

Huang, Y. et al. "Compressed Pattern Diagnosis for Scan Chain Failures", IEEE Proceedings International Test Conference, 8 pgs (2005).

Tzeng, C.-W. et al. "Output Test Compression for Compound Defect Diagnosis", IEEE 8th International Conference ASIC, pp. 569-572 (Oct. 2009).

Extended European Search Report for Patent Appl. 11290601.1 (May 15, 2012).

Mentor Graphics, "Combining Low Pin Count Test with Scan Compression Dramatically Reduces Test Interface and Cost"; Silicon Test & Yield Analysis Whitepaper; 9 pgs.; Apr. 2010.

* cited by examiner

SECURE LOW PIN COUNT SCAN

CROSS-REFERENCE TO RELATED APPLICATIONS

This application claims the priority under 35 U.S.C. §119 of European patent application no. 11290601.1, filed on Dec. 22, 2011, the contents of which are incorporated by reference herein.

BACKGROUND OF THE INVENTION

Figure 1:
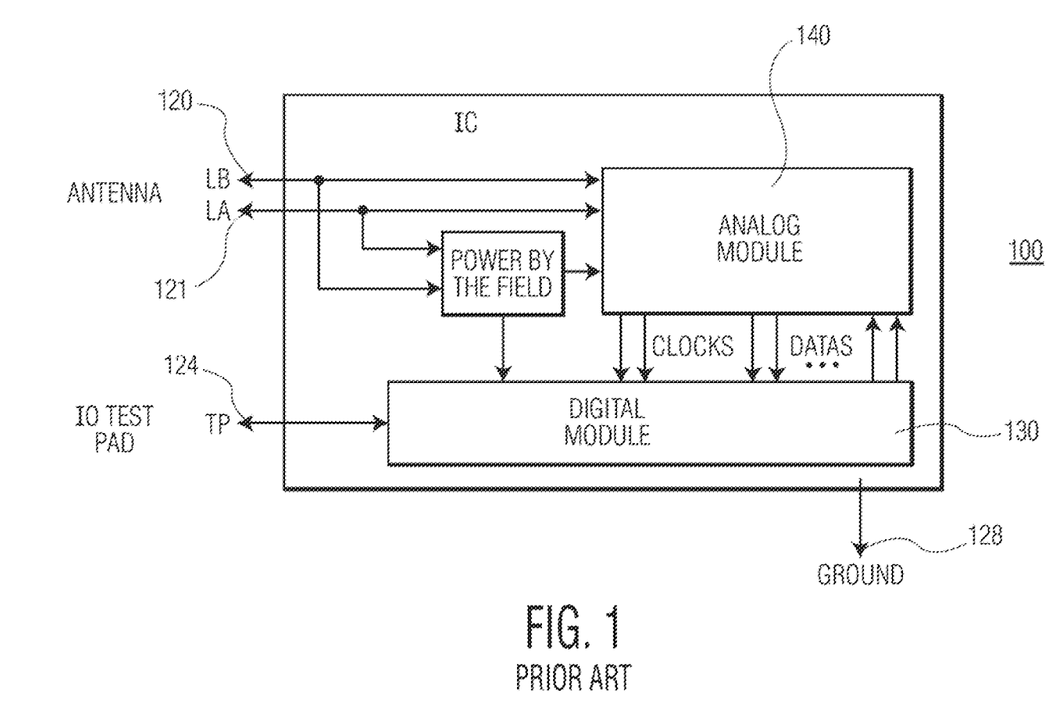
FIG. 1 shows a typical contactless smartcard.

Automatic test pattern generation scans of integrated circuits, both with and without test compression, typically require at least four pins connected to the integrated circuit with the following functions: one scan input pin, one scan output pin, one clock pin and one scan enable signal pin. However, low pin count integrated circuits such as, for example, contactless smartcard integrated circuit 100 shown in FIG. 1 typically only has a total of four pins: two pins 120, 121 for the antenna which also provides the clock and supplies power via the radio frequency field to analog module 140 and digital module 130, one input/output pin 124 which is dedicated for testing and one ground pin 128. Therefore, contactless smartcard integrated circuits are typically tested using functional testing. However, as digital module 130 of contactless smartcard integrated circuit 100 increases in complexity, functional testing is typically insufficient and a structural test using a scan chain approach typically provides better test coverage in less test time but is typically unavailable due to the pin requirement. Additionally, allowing direct scan chain access on secure integrated circuits compromises security by allowing access to internal register values of the integrated circuit.

DETAILED DESCRIPTION OF THE EMBODIMENTS

In accordance with the invention, a secure scan based test is disclosed that requires the use of only one clock pin and an input/output pin of an integrated circuit such as a contactless smartcard. Additionally, two levels of data compression are used along with a mask signal that protects the functional register values of the integrated circuit.

The mask signal is typically used to mask indeterminate test output states using an AND operation so that these states do not propagate into the signature generator circuit resulting in an invalid state for the signature generator. These indeterminate test output states may be generated by, for example, clock domain intercommunication or the non-scanned part of the integrated circuit. The position of these indeterminate states is well known when the scan test pattern is generated because all scan data input during a scan test is controlled by the tester. The indeterminate states may be at different locations for different test scan sequences which are generated from different scan test pattern values. For example, assume the scan out values are "0101X001" where "X" indicates the position of the indeterminate state. Then the mask signal necessary to mask the indeterminate value is "11110111" which forces the indeterminate value "X" to "0" as the result of an AND operation between the scan out values and the mask signal and which outputs "01010001", for example. It should be noted that the AND gate is used to perform a masking operation in order to prevent indeterminate values from being input into the signature generator. So, other combinatorial logic that is able to mask indeterminate values and be transparent for all other values can be used. For example, an OR gate associated with the mask values "0001000" provides the same functionality as the AND gate described above. For the rest of the invention disclosure, the AND gate is used for exemplary purposes.

The mask values serves to provide a meaningful scan signature as an invalid scan signature typically results when one or more indeterminate values are included in the values used to generate the scan signature. In the event of an attack on the smartcard chip, for example, the indeterminate output test states cannot be pre-calculated so that a fixed or incorrect mask signal during an attack results in an invalid scan signature. Hence, if an attacker attempts to shift out a scan chain without knowing the correct mask values, the attacker will obtain an invalid signature that typically allows no meaningful information to be extracted. Thus, the need for correct mask values serves to inhibit attacks on the smartcard chip.

Figure 2:
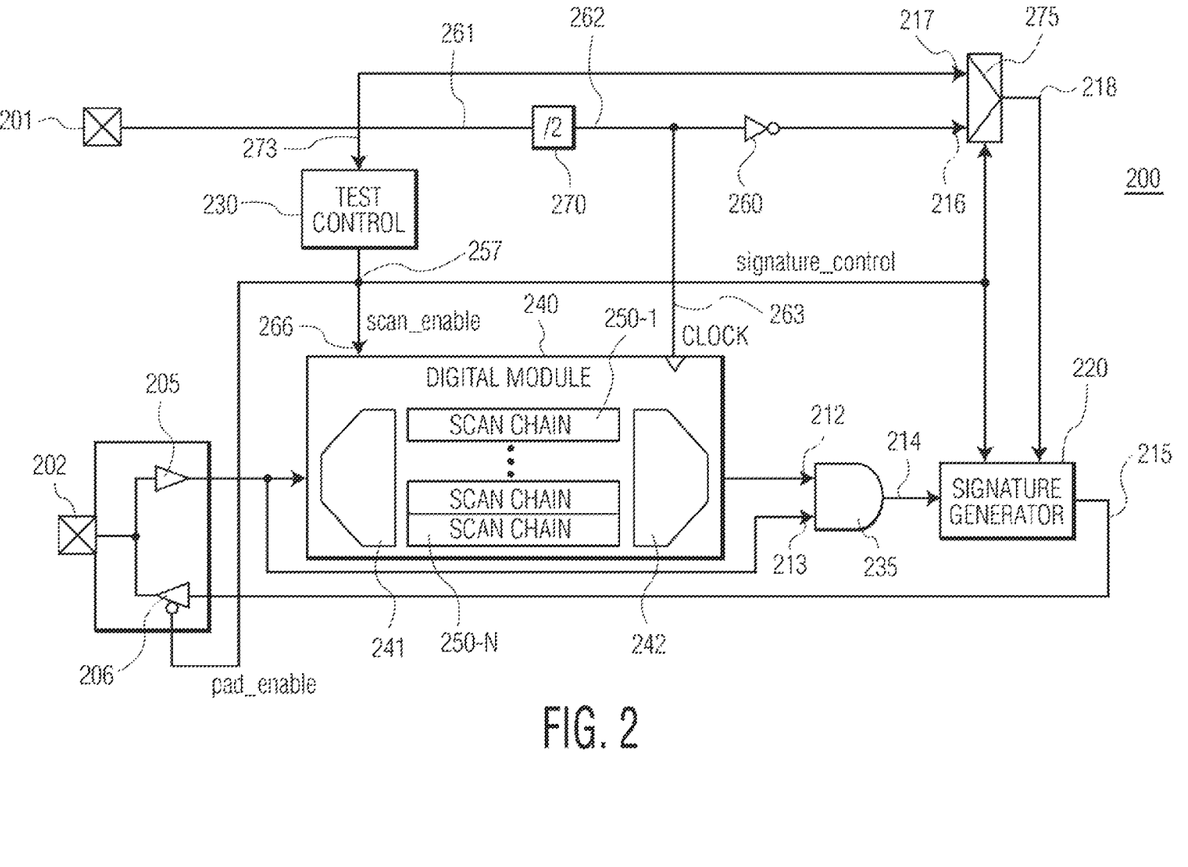
FIG. 2 shows an embodiment in accordance with the invention.

FIG. 2 shows an embodiment in accordance with the invention. Smartcard integrated circuit 200 has clock pin/pad 201 and test pin/pad 202. Clock pin/pad 201 is connected to input 217 of multiplexer 275, to input 261 of clock divider 270 and input 273 of test control logic 230. Output 262 of clock divider 270 is connected to clock input 263 of digital module 240 and to the input of inverter 260. The output of inverter 260 is connected to input 216 of multiplexer 275. Output 218 of multiplexer 275 is connected to signature generator 220.

Test pin/pad 202 is connected to input buffer 205 and the output of active low three state output buffer 206. The input of active low three state output buffer 206 is connected to output 215 of signature generator 220. The control input of active low three state output buffer 206 is connected to output 257 of test control logic 230. Output 257 of test control logic 230 is also connected to input 266 of digital module 240, to signature generator 220 and to the select line of multiplexer 275. Input buffer 205 is connected to digital module 240. Digital module 240 includes scan chain de-compressor 241 which receives input from input buffer 205 and scan chain compactor 242 which outputs to input 212 of AND gate 235. Input 213 of AND gate 235 is connected to input buffer 205. Output 214 of AND gate 235 is connected to signature generator 220.

Figure 3A:
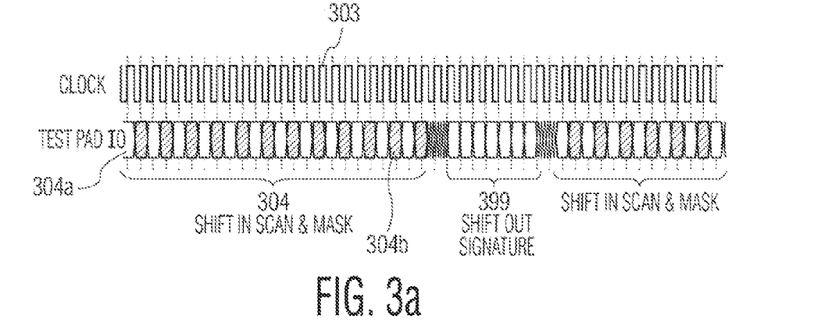
FIGS. 3a-d show timing diagrams for an embodiment in accordance with the invention.
Figure 3B:
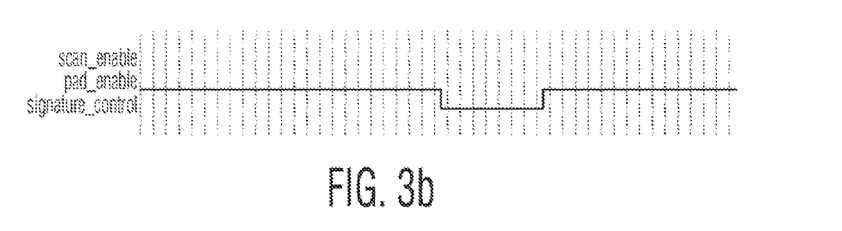
Figure 3C:
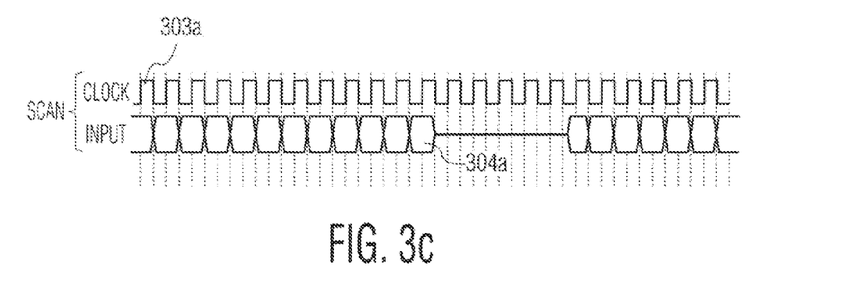
Figure 3D:
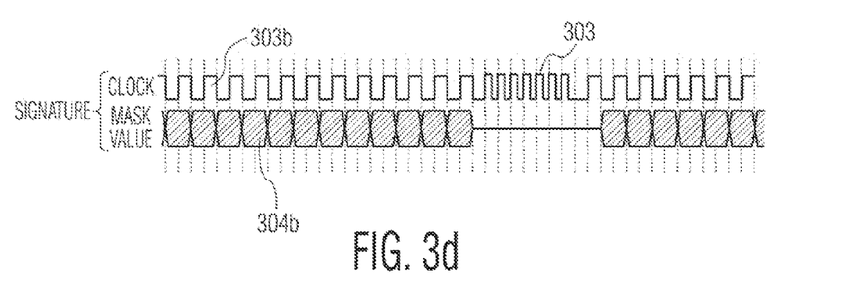

FIGS. 3a-d show a typical timing diagram for the embodiment in FIG. 2. In FIGS. 3a-d, signature 399 is read (shifted out) for each test scan sequence (shift input, capture, shift output). Clock signal 303 is input to integrated circuit 200 via clock pin/pad 201. Test values 304 are input into integrated circuit 200 via test pad/pin 202. Test values 304 interleave scan test pattern values 304a and mask values 304b as shown in FIG. 3a. Test control logic 230 generates signals "scan_enable", "pad_enable" and "signature_control" which are all enabled when output 257 of test control logic 230 goes to "1" or high and disabled when output 257 of test control logic 230 goes to "0" or low as shown in FIG. 3b. Clock divider 270 divides by two the frequency of clock signal 303 shown in FIG. 3a received from clock pin/pad 201 and outputs scan clock signal 303a shown in FIG. 3c. Scan clock signal 303a is provided to clock input 263 of digital module 240 and to inverter 260. Inverter 260 outputs signature clock signal 303b as shown in FIG. 3d and is provided to input 216 of multiplexer 275. Note that clock signals 303a and 303b are therefore the inverse of each other. Additionally, clock signal 303 shown in FIG. 3a is supplied from clock pin/pad 201 to input 217 of multiplexer 275.

During a test of digital module 240 of integrated circuit 200 in an embodiment in accordance with the invention, the "pad_enable" signal that goes to the control input of active low three state output buffer 206 is set to high and test values 304 are clocked into test pad/pin 202 using clock signal 303. Clock signals 303a and 303b (the inverse of clock signal 303a, see FIGS. 3c and 3d) ensure that mask values 304b are extracted to AND gate 235 and scan test pattern values 304a are extracted to digital module 240, respectively. Scan test pattern values 304a are shifted into scan chain de-compressor 241 to form scan chains 250-1 . . . 250-N using clock signal 303a running at half the frequency of clock signal 303. The length of the scan shift input sequence is defined by the longest internal scan chain that needs to be initialized. Similarly, mask values 304b are shifted into AND gate 235 on input 213 using clock signal 303b. Scan chain de-compressor 241 generates scan-in vectors for scan chains 250-1 . . . 250-N and scan chains 250-1 . . . 250-N are captured in the flip-flops of digital module 241 and then shifted out into scan compactor 242. The length of the scan shift output sequence is defined by the longest internal scan chain that needs to be output. In an embodiment in accordance with the invention, scan shift input and scan shift output may be interleaved to reduce test time as the scan shift input of the nth sequence and the scan shift output of the (n−1)th scan sequence may be executed simultaneously.

Scan chain compactor 242 receives scan chains 250-1 . . . 250-N and generates single scan out chain 251 from scan chains 250-1 . . . 250-N and single scan chain 251 is shifted out to input 212 of AND gate 235. Several scan chain compactor structures, implemented by scan test compression tools may be used in accordance with the invention. Scan chain compactor structures are available in commercial tools such as TESTKOMPRESS from MENTOR-GRAPHICS, ENCOUNTER from CADENCE and DFTMAX from SYNOPSYS.

Mask values 304b are shifted on clock signal 303b to input 213 of AND gate 235. Indeterminate states in single scan chain 251 are masked out by sending a "0" mask value into AND gate 235 when the corresponding value in scan chain 251 is indeterminate in order to force the indeterminate value in scan chain 251 to "0". This prevents indeterminate values in scan chain 251 from being input into signature generator 220 which would typically result in signature generator 220 entering an invalid state, therefore rendering the scan signature output meaningless. Signature generator 220, a time compactor, typically generates scan signature 399 using a Linear Feedback Shift Register (LFSR) or cellular automata.

When output 257 of test control logic 230 goes low as shown in FIG. 3b, "scan_enable", "pad_enable" and "signature_control" values go to "0" or low. With reference to FIG. 2 and FIGS. 3a-d, this causes the select line to multiplexer 275 to go low resulting in clock signal 303 being supplied to signature generator 220 on output 218 of multiplexer 275 and results in the shift out of scan signature 399 (see FIG. 3a) from signature generator 220. Additionally, "scan_enable" going to "0" or low stops input of scan values 304a to digital module 240 (see FIG. 3c) and input of mask values 304b to AND gate 235 (see FIG. 3d). Finally, "pad_enable" going to "0" or low activates active low three state output buffer 206 so that scan signature 399 is output on test pin/pad 202.

After scan signature 399 is output, test values 394 are input into integrated circuit 200 via test pad/pin 202. Test values 394 interleave scan test pattern values 394a and mask values 394b as shown in FIG. 3a and the process is repeated until the entire set of scan test patterns has been shifted through digital module 240 and a scan signature has been generated for each set of scan test pattern values generated by the automatic test equipment.

Typically, generating a separate signature for each input scan test pattern as shown in FIGS. 2 and 3a-d provides a better chance for fault localization and an easier implementation but also increases the chances of a successful attack because the signature is easier to analyze. For example, output 257 of test control logic 230 can be reused for "scan_enable", "pad_enable" and "signature_control" values as discussed above. However, the sequence length used to create the scan signature is defined by the scan length so for comparatively short scan lengths it is important to make sure that signature generator 220 generates a unique scan signature for each set of scan test pattern values. For example, in the case of a Linear Feedback Shift Register (LFSR) being used as signature generator 220, the aliasing probability, $P_{alias}$, is linked to the scan length used to generate the scan signature:

$$P_{alias} = \frac{2^{M-n}-1}{2^M-1} \sim 2^{-n} \text{ for large } M \quad (1)$$

where M is scan length and n is the number of stages of the LFSR. The aliasing probability can be reduced, by for example, computing only one scan signature for all the scan test patterns.

Figure 4:
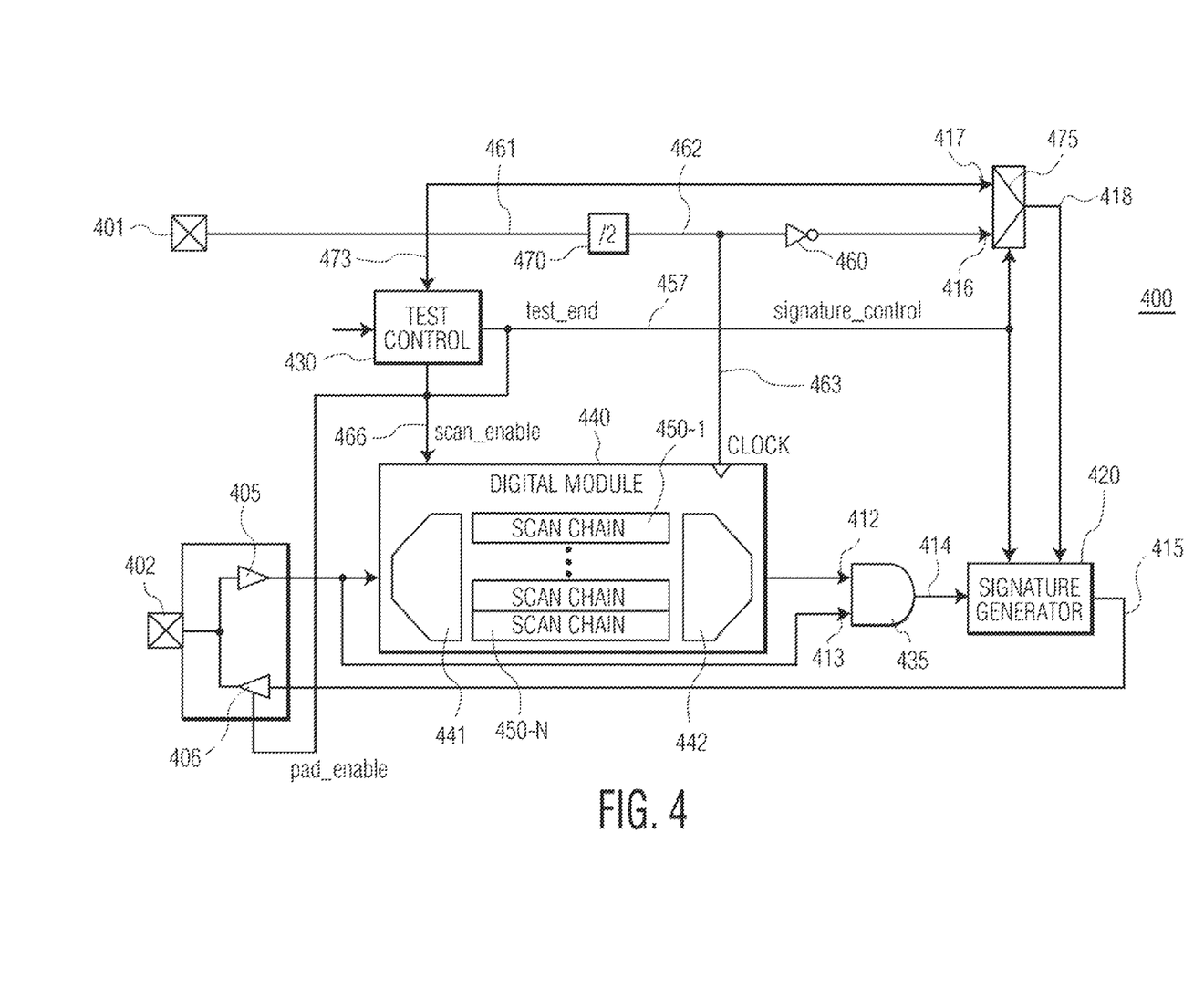
FIG. 4 shows an embodiment in accordance with the invention.

FIG. 4 shows an embodiment in accordance with the invention. Smartcard integrated circuit 400 has clock pin/pad 401 and test pin/pad 402. Clock pin/pad 401 is connected to input 417 of multiplexer 475, to input 461 of clock divider 470 and input 473 of test control logic 230. Output 462 of clock divider 470 is connected to clock input 463 of digital module 440 and to the input of inverter 460. The output of inverter 460 is connected to input 416 of multiplexer 475. Output 418 of multiplexer 475 is connected to signature generator 420.

Test pin/pad 402 is connected to input buffer 405 and the output of active low three state output buffer 406. The input of active high three state output buffer 406 is connected to output 415 of signature generator 420. The control input of active high three state output buffer 406 is connected to output 457 of test control logic 230. Output 457 of test control logic 230 is also connected to signature generator 420 and to the select line of multiplexer 475. Output 466 of test control logic 430 is connected to digital module 440. Input buffer 405 is connected to digital module 440. Digital module 440 includes scan chain de-compressor 441 which receives input from input buffer 405 and scan chain compactor 442 which outputs to input 412 of AND gate 435. Input 413 of AND gate 435 is connected to input buffer 405. Output 414 of AND gate 435 is connected to signature generator 420.

Figure 5A:
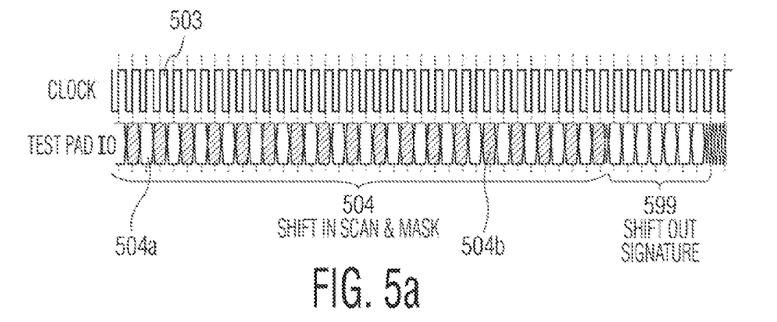
FIGS. 5a-e show timing diagrams for an embodiment in accordance with the invention.
Figure 5B:
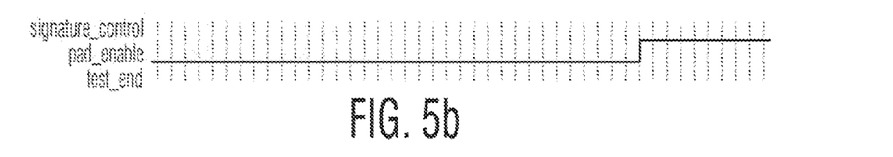
Figure 5C:
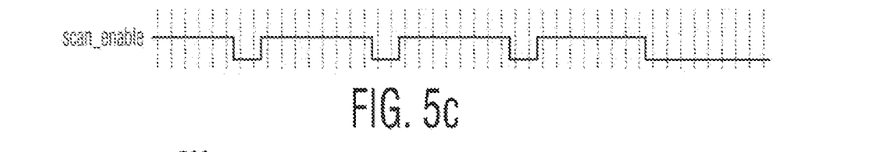
Figure 5D:
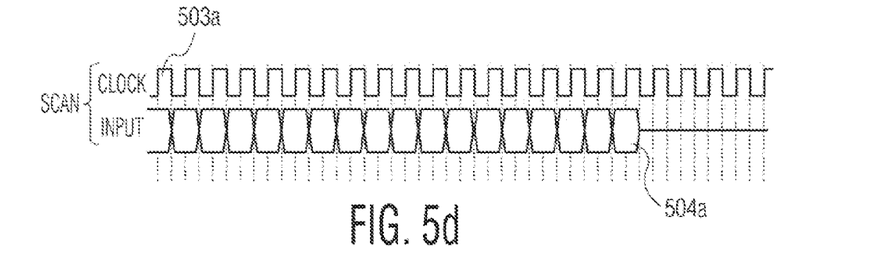
Figure 5E:
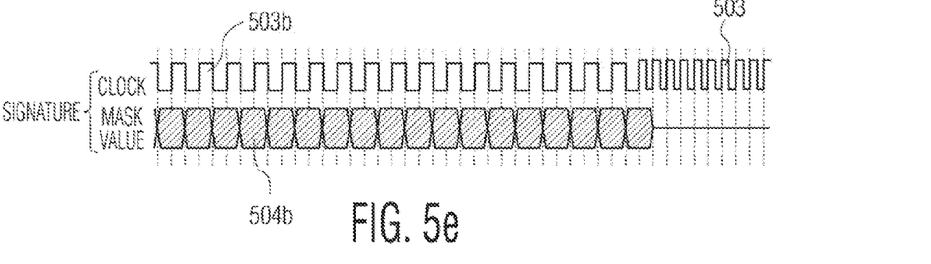

FIGS. 5a-e show a typical timing diagram for the embodiment in FIG. 4. In FIGS. 5a-e, signature 599 is generated and read (shifted out) only after the conclusion of all test scan sequences and provides improved security because less data passes out of integrated circuit 400. However, this embodiment also typically complicates the signature analysis. Clock signal 503 is input to integrated circuit 400 via clock pin/pad 401. Test values 504 are input into integrated circuit 400 via test pad/pin 402. Test values 504 interleave scan test pattern values 504a and mask values 504b as shown in FIG. 5a. Test control logic 430 generates signals "scan_enable", "pad_enable", "test_end" and "signature_control". "Pad_enable", "test_end" and "signature_control" are controlled by output 457 of test control logic 430 which goes to "1" or high and is disabled when output 457 of test control logic 430 is "0" or low as shown in FIG. 5b. "Scan_enable" is enabled when output 466 of test control logic is "1" or high and is disabled when output 466 of test control logic 430 is "0" or low as shown in FIG. 5c. Clock divider 470 divides by two the frequency of clock signal 503 shown in FIG. 5a received from clock pin/pad 401 and outputs scan clock signal 503a shown in FIG. 5d. Scan clock signal 503a is provided to clock input 463 of digital module 440 and to inverter 460. Inverter 460 outputs signature clock signal 503b shown in FIG. 5e which is provided to input 416 of multiplexer 475. Note that clock signals 503a and 503b are therefore the inverse of each other. Additionally, clock signal 503 shown in FIG. 5a is supplied from clock pin/pad 401 to input 417 of multiplexer 475.

During a test of digital module 440 of integrated circuit 400 in an embodiment in accordance with the invention, the "pad_enable" signal that goes to the control input of active high three state output buffer 406 is set to low and test values 504 are clocked into test pad/pin 402 using clock signal 503. Clock signals 503a and 503b (the inverse of clock signal 503a, see FIGS. 5c and 5d) ensure that mask values 504b are extracted to AND gate 435 and scan test pattern values 504a are extracted to digital module 440, respectively. Scan test pattern values 504a are shifted into scan chain de-compressor 441 to form scan chains 450-1 . . . 450-N using clock signal 503a running at half the frequency of clock signal 503. The length of the scan shift input sequence is defined by the longest internal scan chain that needs to be initialized. Similarly, mask values 504b are shifted into AND gate 435 on input 413 using clock signal 503b. Scan chain de-compressor 441 generates scan-in vectors for scan chains 450-1 . . . 450-N and scan chains 450-1 . . . 450-N are captured in the flip-flops of digital module 441 and then shifted out into scan compactor 442 when the "scan_enable" signal on output 466 of test control logic 430 goes low (see FIG. 5c). The length of the scan shift output sequence is defined by the longest internal scan chain that needs to be output. In an embodiment in accordance with the invention, scan shift input and scan shift output may be interleaved to reduce test time as the scan shift input of the nth sequence and the scan shift output of the (n−1)th scan sequence may be executed simultaneously.

Scan chain compactor 442 takes scan chains 450-1 . . . 450-N and generates single scan chain 451 from scan chains 450-1 . . . 450-N. Then the "scan_enable" signal on output 466 of test control logic 430 goes high (see FIG. 5c) and another test scan sequence is shifted into digital module 440 and the process is repeated as described above with the resulting scan chains being added to single scan chain 451 by scan chain compactor 442. The process is repeated until all the desired test scan sequences have been input into digital module 440.

Then "signature_control", "test_end" and "pad_enable" signals on output 457 of test control logic 430 go high (see FIG. 5b) and single scan chain 451 is shifted out to input 412 of AND gate 435. Several scan chain compactor structures, implemented by scan test compression tools may be used in accordance with the invention. Scan chain compactor structures are available in commercial tools such as TESTKOMPRESS from MENTOR-GRAPHICS, ENCOUNTER from CADENCE and DFTMAX from SYNOPSYS.

Mask values 504b are shifted on clock signal 503b to input 413 of AND gate 435. Indeterminate states in single scan chain 451 are masked out by sending a "0" mask value into AND gate 435 when the corresponding value in scan chain 451 is indeterminate in order to force the indeterminate value in scan chain 451 to "0". This prevents indeterminate values in scan chain 451 from being input into signature generator 420 which would typically result in signature generator 420 entering an invalid state, therefore rendering the scan signature output meaningless. Signature generator 420, a time compactor, typically generates scan signature 499 using a Linear Feedback Shift Register (LFSR) or cellular automata.

When output 457 of test control logic 430 goes high as shown in FIG. 5b, "pad_enable", "test end" and "signature_control" values on output 457 of test control logic 430 go to "1" or high. With reference to FIG. 4 and FIGS. 5a-e, this causes the select line to multiplexer 475 to go high resulting in clock signal 403 being supplied to signature generator 420 on output 418 of multiplexer 475. This results in the generation and shift out of scan signature 499 (see FIG. 5a) from signature generator 420. Additionally, "scan_enable" goes to "0" or low which stops input of scan values 504a to digital module 440 (see FIG. 5c). Finally, "pad_enable" goes to "1" or high, activating active high three state output buffer 406 so that scan signature 599 is output on test pin/pad 402 and stops input of mask values 504b to AND gate 435 (see FIG. 5c).

To provide added security against attack and increase the security of the smartcard, digital modules 240 and 440 can have embedded IDs unique to the particular integrated circuits 200 and 400, respectively, as encryption keys in embodiments in accordance with the invention. The encryption key is part of the internal scan chains and may be unique for each integrated circuit, e.g., a unique identifier similar to a serial number or an identifier repeated only a small number of times among the integrated circuits. The bits of the encryption key may be coupled to added flip-flop inputs that are dispersed throughout digital modules 240 and 440. Then, during scan capture mode, values that differ from integrated circuit to integrated circuit similar to for example, serial numbers are captured by the flip-flops. Subsequently, the key values captured on the internal scan chain modify bits on the output of compactor 242 or 442 that is used to generate scan signature 399 or 599, respectively.

The position of the modified output bits depends on the shifted in scan test pattern values 304a or 504a. For test purposes, in order to generate a consistent scan signature 399 or 599 for the integrated circuits having different encryption keys, complete knowledge of the position of each of the modified bits is needed in order to create mask values 304b or 504b such the modified bits are masked out as is done also for the indeterminate values as described above. Without knowledge of the encryption key positions and of the scan test pattern values 304b and 504b used for testing, an attacker will typically be unable to mask out the correct positions and the encryption key will result in a modification of scan signature 399 or 599 from integrated circuit to integrated circuit. The encryption key therefore further increases the difficulty of mounting an attack on integrated circuit 200 or 400 by extracting relevant data from scan signatures 399 or 499, respectively, to analyze secure design features.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A contactless smartcard integrated circuit comprising:
a digital module;
a first pin for inputting a clock signal, the first pin being electrically coupled to the digital module;
a second pin for both inputting a test scan sequence and outputting scan data, the second pin being electrically coupled to the digital module; and
a test control logic for controlling both input to the second pin and output from the second pin,
wherein the digital module comprises a scan chain compactor configured to create a single scan chain,
wherein the scan chain compactor is electrically coupled to a first input of a comparative logic and an output of the comparative logic is electrically coupled to a signature generator,
wherein a second input of the comparative logic is electrically coupled to an input buffer, the input buffer being electrically coupled to the second pin such that mask data may be provided to the second input of the comparative logic from the second pin.

2. The integrated circuit of claim 1 wherein the digital module comprises a scan chain decompressor for generating at least one scan chain, the scan chain decompressor being electrically coupled to the second pin.

3. The integrated circuit of claim 1 wherein the signature generator is electrically coupled to an output buffer, the output buffer being electrically coupled to the second pin.

4. The integrated circuit of claim 1 wherein a clock divider is electrically coupled to the first pin and to the digital module, such that a divided clock signal is received by the digital module.

5. The integrated circuit of claim 4, wherein the divided clock signal passes through an inverter and is provided to the signature generator.

6. The integrated circuit of claim 1 wherein the scan chain compactor is electrically coupled to the signature generator configured to output a scan signature to the second pin.

7. The integrated circuit of claim 6 wherein the digital module comprises a scan chain decompressor for generating a plurality of scan chains, the scan chain decompressor being electrically coupled to the second pin.

8. The integrated circuit of claim 6 wherein the scan chain compactor is electrically coupled to the signature generator and the signature generator is configured to output a single scan signature to the second pin in response to an input of a plurality of test scan sequences.

9. The integrated circuit of claim 1 wherein the digital module has a unique embedded encryption key.

10. The integrated circuit of claim 1 wherein the second pin is further arranged for inputting a plurality of test scan sequences.

11. The integrated circuit of claim 1, wherein the integrated circuit comprises only two pins, and wherein the two pins comprise the first pin and the second pin.

12. The integrated circuit of claim 1, wherein the comparative logic comprises an AND gate.

* * * * *